US011226982B2

(12) United States Patent
Ritter et al.

(10) Patent No.: US 11,226,982 B2
(45) Date of Patent: Jan. 18, 2022

(54) SYNCHRONIZATION OF OFFLINE INSTANCES

(71) Applicant: SAP SE, Walldorf (DE)

(72) Inventors: Gerd Martin Ritter, Heidelberg (DE); Pradeep Kumar Singh, Bangalore (IN); Tim Kornmann, Reilingen (DE); Rene Gross, Heidelberg (DE)

(73) Assignee: SAP SE, Walldorf (DE)

( * ) Notice: Subject to any disclaimer, the term of this patent is extended or adjusted under 35 U.S.C. 154(b) by 163 days.

(21) Appl. No.: 16/392,433

(22) Filed: Apr. 23, 2019

(65) Prior Publication Data

US 2019/0251096 A1    Aug. 15, 2019

Related U.S. Application Data

(63) Continuation of application No. 14/977,558, filed on Dec. 21, 2015, now Pat. No. 10,311,082.

(51) Int. Cl.
  *G06F 16/27* (2019.01)
  *H04L 29/08* (2006.01)
  *G06F 16/93* (2019.01)

(52) U.S. Cl.
  CPC .............. *G06F 16/27* (2019.01); *G06F 16/93* (2019.01); *H04L 67/1095* (2013.01)

(58) Field of Classification Search
  CPC ....... G06F 16/27; G06F 16/93; H04L 67/1095
  See application file for complete search history.

(56) References Cited

U.S. PATENT DOCUMENTS

| | | | | |
|---|---|---|---|---|
| 2002/0049776 A1* | 4/2002 | Aronoff | .................. | G06F 16/27 |
| 2002/0194207 A1* | 12/2002 | Bartlett | .................... | G06F 16/27 |
| 2008/0270485 A1* | 10/2008 | Yu | .......................... | G06F 16/275 |
| 2009/0157802 A1* | 6/2009 | Kang | ..................... | G06F 16/275 |
| | | | | 709/203 |
| 2009/0247134 A1* | 10/2009 | Jeide | .................... | H04L 67/1095 |
| | | | | 455/414.2 |
| 2011/0093619 A1* | 4/2011 | Nelson | .................... | H04L 67/04 |
| | | | | 709/248 |
| 2011/0126256 A1* | 5/2011 | Wang | ................. | H04N 21/4344 |
| | | | | 725/116 |
| 2013/0124601 A1* | 5/2013 | Goldman | ................ | H04L 67/02 |
| | | | | 709/203 |

* cited by examiner

*Primary Examiner* — Pierre M Vital
*Assistant Examiner* — Andrew N Ho
(74) *Attorney, Agent, or Firm* — Klarquist Sparkman, LLP

(57) ABSTRACT

An enterprise system which facilitates synchronization of offline data. Offline data created during an offline session or sessions (collectively an offline session) prior to synchronization is assigned a temporary key. Changes of offline data created during an offline session is assigned the temporary key of the data to which the change is associated. The temporary key is mapped to a new created backend key and stored in a mapping table. Using the mapping table, temporary keys associated with the changes are swapped with backend keys which the temporary keys are mapped. This maintains data persistency of newly created and change data during an offline session.

12 Claims, 4 Drawing Sheets

SYNCHRONIZATION OF OFFLINE INSTANCES

CROSS-REFERENCE TO RELATED APPLICATION

This application is a continuation of U.S. application Ser. No. 14/977,558, filed Dec. 21, 2015, the contents of which is incorporated herein by reference in its entirety.

TECHNICAL FIELD

The present disclosure relates to computer systems, and more specifically, to a framework for facilitating update of offline data.

BACKGROUND

Enterprise systems contain data used by numerous users. Generally, enterprise data is created or manipulated on a client device and synchronized with a server. For example, new data can be created or new rows can be added to lists like items of a sales order. When data is synchronized with the backend server, a backend key is generated and associated with the data.

However, a problem with conventional enterprise systems exists when data is created offline and prior to synchronizing with the server, it is subsequently changed. The creation and subsequent change results in different instances of data. However, since the created data has not been synchronized, no backend key is associated with it. When the created data and change data are synchronized, the server generates two different backend keys, one for the original data and another for the change data. This unfortunately results in non-persistent data.

From the foregoing discussion, it is desirable to provide an enterprise system which avoids non-persistent data.

SUMMARY

A framework for providing an enterprise system which facilitates synchronization of offline data is described herein. In accordance with one aspect, a computer implemented method for uploading offline data is disclosed. The method includes generating offline change data using a client runtime of a frontend sub-system of an enterprise data system residing on an end user device, wherein the offline change data comprises a change data type. The change data type is selected from a newly created base document, a change to the newly created base document, and a change to a previously synchronized base document. The method also includes processing the offline change data. The offline change data includes determining the change data type, and if the change data type includes the newly created base document, the processing generates a new unique client key associated with the newly created base document. If the change data type includes the change to the newly created base document, associating the new client key of the newly created base document to the change of the newly created base document. If the change data type includes the previously synchronized base document, associated a backend key of the previously synchronized base document to the change of the previously synchronized base document.

The method further includes storing the change data and associated key as an entry in a synchronization queue. The synchronization queue is synchronized with a backend sub-system of the enterprise data system residing on a server when the end user device is online. Synchronizing with the backend sub-system includes processing the synchronization queue, wherein if the change data is the newly created base document, the processing includes generating a new backend key, the new backend key is associated with the newly created base document, and mapping the new backend key to the client key associated with the newly created base document to form a mapped key pair in a key mapping table. If the change data type is the change of the newly created base document or the previously synchronized base document, the processing includes assigning the backend key associated with the newly created base document or the previously synchronized base document with which the change data is associated. The method further includes storing the change data in the backend sub-system.

In another aspect, a computer implemented method for uploading offline data is disclosed. The method includes generating offline change data using a client runtime of a frontend sub-system of an enterprise data system residing on an end user device, wherein the offline change data comprises a change data type. The change data type is selected from a newly created base document, a change to the newly created base document, and a change to a previously synchronized base document. The method also includes processing the offline change data. The offline change data includes determining the change data type, and if the change data type includes the newly created base document, the processing generates a new unique client key associated with the newly created base document. If the change data type includes the change to the newly created base document, associating the new client key of the newly created base document to the change of the newly created base document. If the change data type includes the previously synchronized base document, associated a backend key of the previously synchronized base document to the change of the previously synchronized base document. The method further includes storing the change data and associated key as an entry in a synchronization queue.

In yet another aspect, an enterprise system which includes a frontend sub-system residing on an end user device is disclosed. The frontend sub-system facilitates synchronization of offline change data with a backend sub-system residing on a server, wherein the offline change data comprises a change data type. The change data type is selected from a newly created base document, a change to the newly created base document, and a change to a previously synchronized base document. The frontend sub-system includes a client key generator unit for generating a client key when the offline change data includes the newly created base document. The client key is associated with the newly created base document. The frontend sub-system further includes a synchronization queue containing entries with offline change data and associated keys. The associated key is a client key generated by the client key generator when the offline change data is the newly created base document. The associated key is a client key associated with the newly created base document when the offline change data is the change to the newly created base document. A backend key of the previously synchronized base document is associated to the change of the previously synchronized base document.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A framework is provided for updating data for an enterprise system. An enterprise system includes numerous users which can be offline (not connected) or online (connected). The framework, in particular, facilitates synchronization of offline data with the enterprise system when a user is online.

Figure 1:
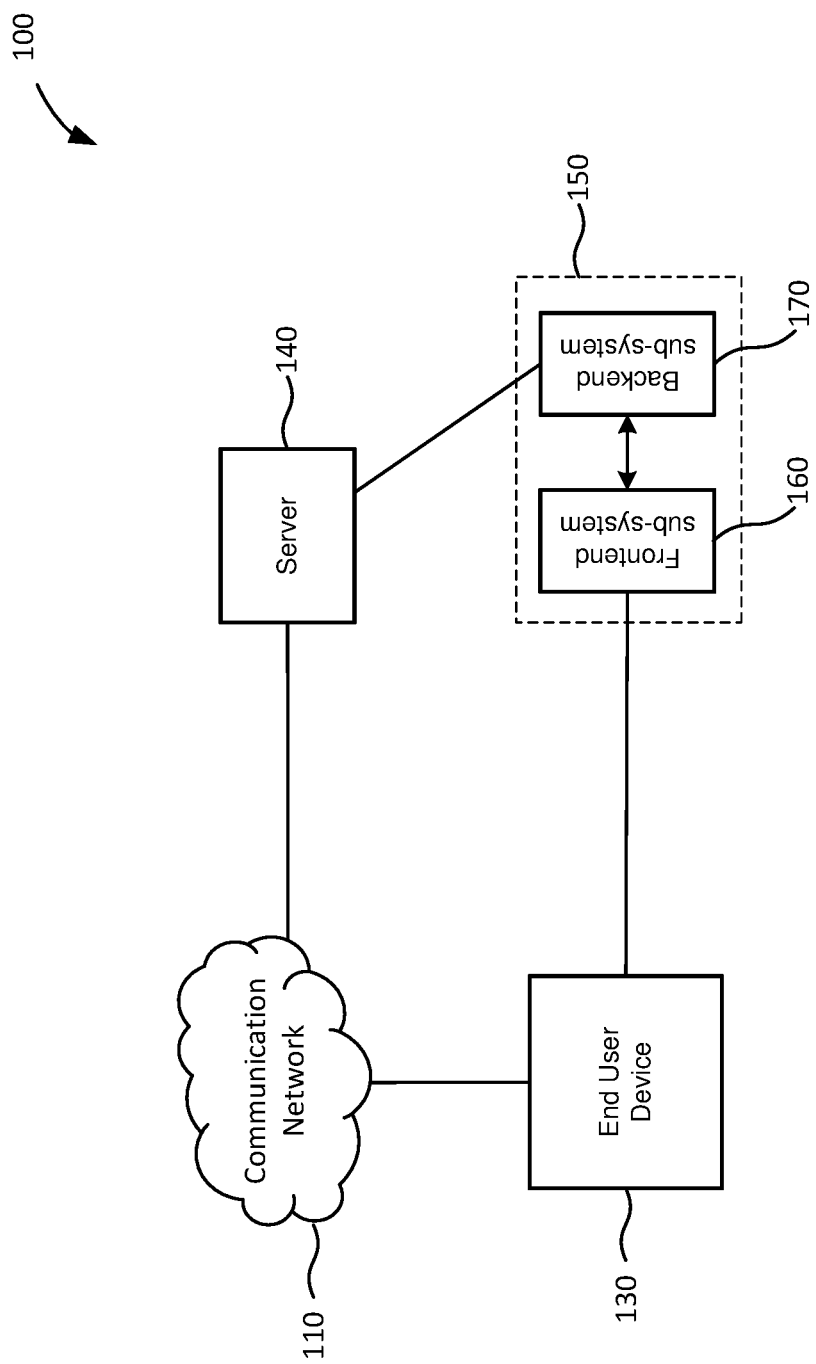
FIG. 1 shows a simplified diagram of an exemplary enterprise system.

FIG. 1 shows a simplified diagram of an exemplary environment 100. The environment 100, for example, includes a server 140 and an end user device 130 interconnected to a communication network 110. The environment may include other components.

A server may include one or more computers or servers. A computer includes a memory and a processor. Various types of computers may be employed for the server. For example, the computer may be a mainframe, a workstation as well as other types of processing devices. The memory of a computer may include any memory or database module. The memory may be volatile or non-volatile types of non-transitory computer-readable media such as magnetic media, optical media, random access memory (RAM), read-only memory (ROM), removable media, or any other suitable local or remote memory component. The computers or servers are connected through a communication network such as internet, intranet, local area network (LAN), wide area network (WAN) or a combination thereof. The servers, for example, are part of the same private network. The servers may be located in single or multiple locations.

As for the user device, it may be any local computing device with, for example, a local memory and a processor. The memory may be volatile or non-volatile types of non-transitory computer-readable media such as magnetic media, optical media, RAM, ROM, removable media, or any other suitable local or remote memory component. As shown, the end user device includes a mobile device, such as a smart phone device. Other types of mobile devices may also serve as an end user device. For example, the end user mobile device may be a laptop personal computer (PC), a tablet PC, tabs as well as other types of mobile devices. The end user device may also be a non-mobile device, such as a workstation or desktop PC. Illustratively, the environment includes one end user device. It is to be understood, however, that the environment may include numerous end user devices connected to the communication network which accesses the server. The end user devices may be any type or combination of types of end user devices. For example, the end user devices may include mobile and non-mobile devices.

As discussed, the various components of the network are connected through the communication network. For example, components of the network may be connected by internet. Other types of networks or network connections may also be useful. For example, the network connections may include a WIFI or a 3G/4G/LTE connection. In some cases, the network may be a cloud. A user may connect to the server using the user device. The user device may be referred to as the client or frontend side while the information layout generation system may be referred to as the server or backend side. Other types of configurations may also be useful.

In one embodiment, the environment may include an enterprise system 150. In one embodiment, the enterprise system may include an enterprise resource planning (ERP) application. The enterprise system may include other business-oriented tools which serve various functions. Such functions may include accounting, business intelligence, process management, content management, customer relationship management, resource planning, asset management, supply chain management as well as other functions. For example, the enterprise system may include a collection of software applications which serve various needs or functions of an enterprise.

In one embodiment, the enterprise system is configured as a distributed system. For example, the enterprise system is configured with a client-server architecture. For example, the enterprise system includes a server-side or backend sub-system 170 residing on a server 140 and a client-side or frontend sub-system 160 residing on an end user device 130.

The enterprise system, when invoked by a user, may be used to generate data. The user may also manipulate or change existing data. The enterprise system may be used by a plurality of users. Users may be assigned an account. A user may access the backend or server-side by initiating and logging in to the enterprise system through the frontend sub-system or client-side when connected to the network (online). Logging in may be automatically or manually performed by the frontend sub-system. For example, a user may pre-set the frontend sub-system with login information or, alternatively, may manually enter the login information. Other techniques for accessing the backend sub-system may also be useful.

A user may generate data while offline. For example, a user may generate or change data for the enterprise system when not connected to a network. In such a case, the data is located in the frontend and synchronized with the backend when the user is online or connected to the backend through the communication network. On the other hand, when online, the generated or change data is saved in both the frontend and backend sub-systems. For example, a user may initiate saving of generated or change data by selecting an enter button or a save button. Other techniques for saving online generated or change data may also be useful.

The enterprise system may include objects, such as business objects. Objects, for example, are data in the enterprise system. Objects can represent various types of data. For example, objects may include accounts (customers), contacts, opportunities sales orders, quotes, activities (e.g., appointments, emails, or phone calls), and service requests. Other types of data may also be useful. Objects may also be master data instances, such as a territory, an employee or an organizational unit. Other types of objects may also be useful. Objects may be created and subsequently changed. The various types of objects may be collectively referred to as documents. The creation and changing of objects or documents may be performed either offline or online.

As discussed, data or documents created or changed offline (offline documents) are synchronized when the user is online. For example, offline documents created by the frontend sub-system are synchronized with the backend sub-system of the enterprise system when the user is online. A document may be in an image format. Other types of document formats may also be useful. Synchronization may be triggered by the user, such as by manually pressing a synchronization button, or automatically once online connectivity is available.

Figure 2:
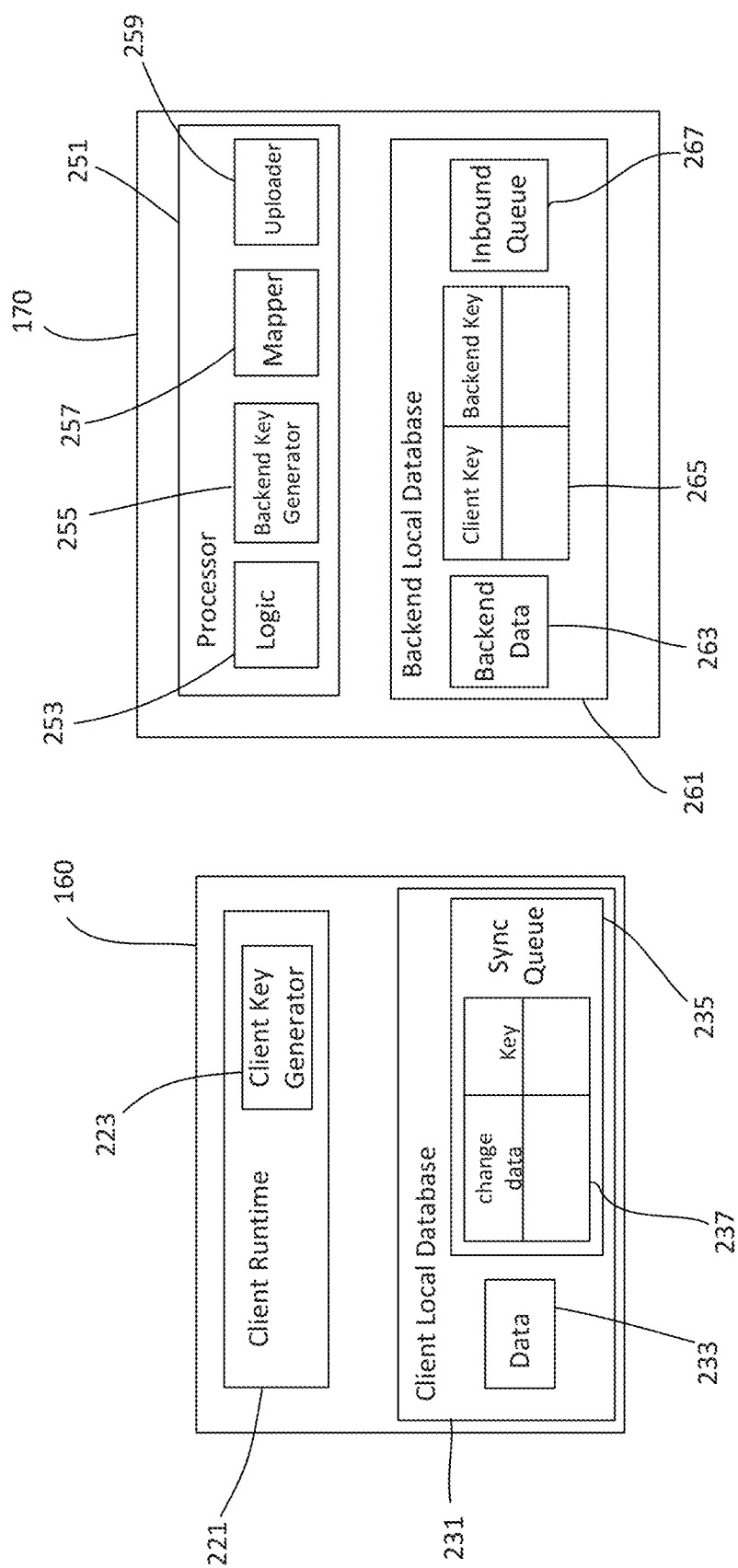
FIG. 2 shows the exemplary enterprise system in greater detail.

FIG. 2 shows an exemplary embodiment of an enterprise system 150. The enterprise includes frontend and backend sub-systems 160 and 170. The frontend sub-system resides in an end user device and the backend subsystem resides in a server.

The frontend sub-system, as shown, includes a client runtime module 221 and a client local database module 231. The client runtime module includes a client key generator unit 223. The client local database module includes a frontend data unit 233 and a synchronization queue unit 235. Providing the frontend sub-system with other modules and units may also be useful.

The client runtime module provides for displaying data to the user, handling frontend logic (including user changes or events), and communicating with the backend sub-system and (in an offline case) with the local database. For example, the runtime module generates or changes data, such as objects or documents. In one embodiment, the runtime module is used to generate data and change data. When offline, new data can be generated and subsequently changed during the same offline session. Existing data may also be changed offline. When online, new data may be generated and saved in the frontend and backend sub-systems. Existing data may also be changed.

In one embodiment, the client runtime module includes a client key or identifier (ID) generator unit 223. Although the client key unit is shown as part of the runtime module, it is understood that it can be a separate module which interacts with the runtime module. The client key generator unit generates a client or temporary key for a newly created offline document. For example, each newly created offline document will have its respective unique temporary key or identifier. The temporary key may be a temporary key set having first and second temporary keys. In one embodiment, a key set includes a human readable temporary key and a non-human readable temporary key. The human readable key may be a unique number, such as 005 while the non-readable key may be a technical key, such as a universally unique identifier (UUID).

Newly created documents, such as objects, are assigned or identified by the temporary key. A temporary key is assigned to all newly created documents by the client key generator, whether created offline or online. Changes may be made to a document. Changes include a change to a base document or even to another change of a change to a base document. Changes also include the use of the data of the base document or a change to a base document. For example, a new contact is created. The contact is used in a new appointment. The appointment which uses the data of the contact is considered a change of the contact. A change has the same key as the base document for which the change is made.

In an offline scenario, a document may be a newly created document (base document) during an offline session. Prior to synchronizing with the backend sub-system, a change is made to the base document. The change may be made during the same or a different offline session so long as no synchronization with the backend sub-system is performed between the different offline sessions. The offline sessions without synchronization may be collectively referred to as one offline session. The change will have the same temporary key with the base document. For example, a user creates a new offline document A1. The key generator generates a temporary key K1 for document A1. Prior to synchronizing with the backend sub-system (e.g., during the same offline session or a different offline session), the user makes a change to document A1. As discussed, a change to document A1 includes the use of data of document A1. The change of document A1 is associated with the temporary key K1.

In an online scenario, the newly created or base document will be assigned a backend key. For example, a backend key is swapped with the temporary key. The change will have the same backend key as the base document. For example, a user creates a new offline document A1. The key generator generates a temporary key K1 for document A1. Document A1 is saved to the backend sub-system and a backend key is assigned to it. A subsequent change to document A1, whether offline or online, will have the same backend key as document A1.

The client local database unit, for example, is a memory storage residing on the end user device. In one embodiment, the client local database unit includes a data unit 233 and a synchronization queue 235. The data unit includes data of the user.

As for the synchronization queue, it contains entries 237 which include change data created on the user device while offline and an associated key. For example, it contains documents which are to be synchronized with the backend sub-system when connectivity to the backend sub-system is available (e.g., online). Change data may include creation of new documents, changes to newly created documents prior to synchronization with the backend sub-system as well as changes to existing documents previously synchronized with the backend sub-system. A change may also include a change to a change of a base document. A change also includes the use of data of a base document or a change to a base document. For example, a new contact is created while offline. While still offline, the contact is used in a new appointment. The appointment which uses the data of the new contact is considered a change of the newly created contact.

A document of a change made to a base document or another change, in one embodiment, contains only the change made. The documents may be in an image format. Providing the documents in other formats may also be useful. Each document may be an entry in the synchronization queue. The entries may be listed in a first-in-first-out (FIFO) order. Other ordering of the entries may also be useful. The list, for example, includes data changes and keys. For a base document and its changes prior to synchronization, they will have the same client key. As a change to a previously synchronized base document, it will maintain the same backend key of the base document assigned by the backend sub-system.

As for the backend sub-system, it includes a processor module 251 and a backend local database 261. The processor module, in one embodiment, includes a logic unit 253, a backend key generator unit 255, a mapper unit 257 and an upload processing unit 259. The backend local database, in one embodiment, includes a backend data unit 263, a key mapping table unit 265 and an inbound queue unit 267. Providing the backend sub-system with other modules and units may also be useful. Although the units are shown as separate units, they may be integrated or combined with one or more other units.

The various units of the processor module process the contents or entries of the inbound queue of the backend local database module. When the end user device is online, the contents of the synchronization queue are synchronized to the inbound queue. In one embodiment, the upload processing unit processes the contents of the inbound queue unit. The upload processing unit may process the entries one at a time in sequence. For example, the upload processing unit processes the entries on a FIFO basis. Processing the entries based on other sequences may also be useful.

The logic unit processes the various entries in the synchronization queue. Processing by the logic unit includes generating enterprise data for the entries. The logic unit may process the entries one at a time in sequence. For example, the logic unit processes the entries on a FIFO basis. Processing the entries based on other sequences may also be useful. The logic unit also processes online data to generate enterprise data.

The backend key generator generates unique backend keys for new objects or documents. The backend keys may be key sets, with a key set having human and non-human readable keys. A newly created offline document having a temporary key will be provided with a backend key by the backend key generator. As such, all unique documents have respective unique backend keys. Unique documents exclude changes to documents. For example, changes to a unique document become part of the unique document and maintains the same backend key.

The mapper unit maps backend keys for documents with temporary keys. For example, documents with client keys will have newly created backend keys mapped to the client keys. To illustrate, assume that the synchronization queue unit includes 2 newly created offline documents A1 and B1. Document A1 may be a first contact and document B1 may be a second contact. In such a case, the client key generator generates a temporary key K1 for document A1 and a temporary key K2 for the document B1. Subsequently during the same offline session, a change is made to document A1. For example, the contact of A1 is used in a new appointment. Temporary key K1 is also associated to the appointment with the contact of document A1 (e.g., change of document A1). The change is saved in the local database on the user device and loaded in the synchronization queue as a new entry with key K1. The backend key generator will generate a backend key BK1 for A1 and a backend key BK2 for B1. The mapper unit maps BK1 to K1 and BK2 to K2. As for the appointment which is a change of document A1, it will be assigned BK1.

The backend local database module includes memory for storing information. The database module may include any type of database. For example, the database may be a relational database or Structured Query Language (SQL)-based database. In one embodiment, the database includes in-memory, such as SAP HANA database from SAP SE. Other types of databases may also be useful.

The backend data unit of the backend module contains data of the user. For example, data of the user includes all data prior to synchronization. As discussed, the enterprise system is shared by many users. The data of all the users of the enterprise system is contained in the backend data unit. Other types of data may also be contained in the backend data unit. For example, the backend data unit may contain other data needed to run the system.

As for the key mapping table unit, it contains a mapping of the temporary and backend keys. For example, the mapping table unit contains the mapping generated by the mapping unit. The mapping generated by the mapper unit is stored in the mapping table unit in the backend local database module. The mapping table may include entries which map a client key to a backend key.

Figure 3:
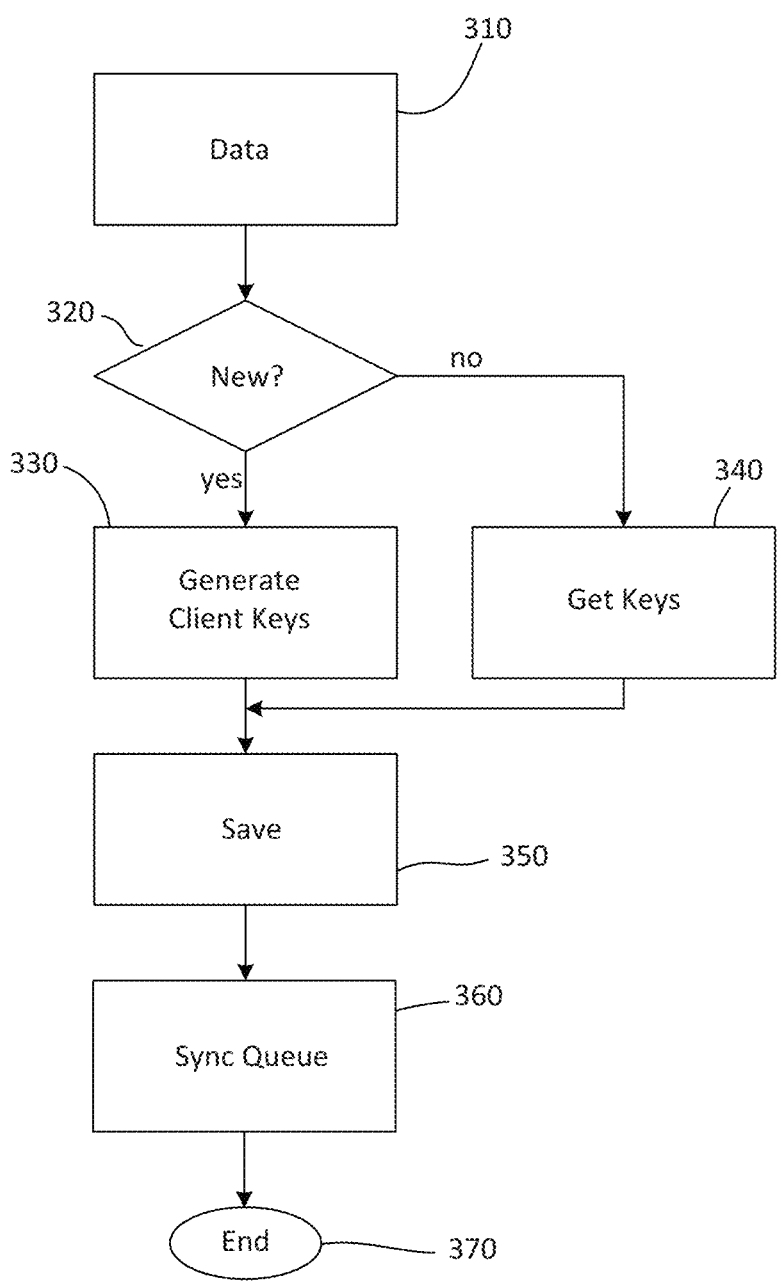
FIG. 3 shows an embodiment of a frontend of an update process flow.

FIG. 3 shows an embodiment of a process 300 for offline generation of data for the enterprise system. For example, the process is performed by the frontend sub-system residing on the end user device. At step 310, offline enterprise data is used or generated by the user. For example, the user may employ the runtime module to generate data. The data, since the user is offline, may be considered as a data change. A data change may include, for example, a new document, a change to a new unsynchronized document or a change to an existing document.

At step 320, the process determines if the data change or document is a newly created document or not. If the change is a newly created document, the process proceeds to step 330. An indication that the change is a newly created document is the lack of a key. For example, a newly created document will not have any keys associated with it at the time of creation. At step 330, the process generates a client or temporary key for the newly created document. For example, the client key generator generates a client key for the newly created document. In one embodiment, the temporary key may be a key set including first and second keys. The keys, for example, include a human readable and a non-human readable key. The process continues to step 350.

On the other hand, if the document is not a newly created document, the process proceeds to step 340. A document which is not new newly created document has a key associated with it. For example, if the data change is a change to an existing document which has been synchronized with the backend sub-system, it will have a backend key associated with it. On the other hand, if the data change is a change to an unsynchronized document with the backend sub-system, it will have a client or temporary key associated with it. At step 340, the process obtains the key from the change of the document. The process continues to step 350.

At step 350, the document is stored in the user local database. The process continues to step 360 where the document and associated key is loaded into the synchronization queue. All documents will have either a client key or a backend key, depending on the type of data change. The process terminates at step 370.

The process, as discussed, is initiated whenever a user changes data. For example, the process is initiated when the user creates a new document, changes a newly created document or changes a previously synchronized base document.

Figure 4:
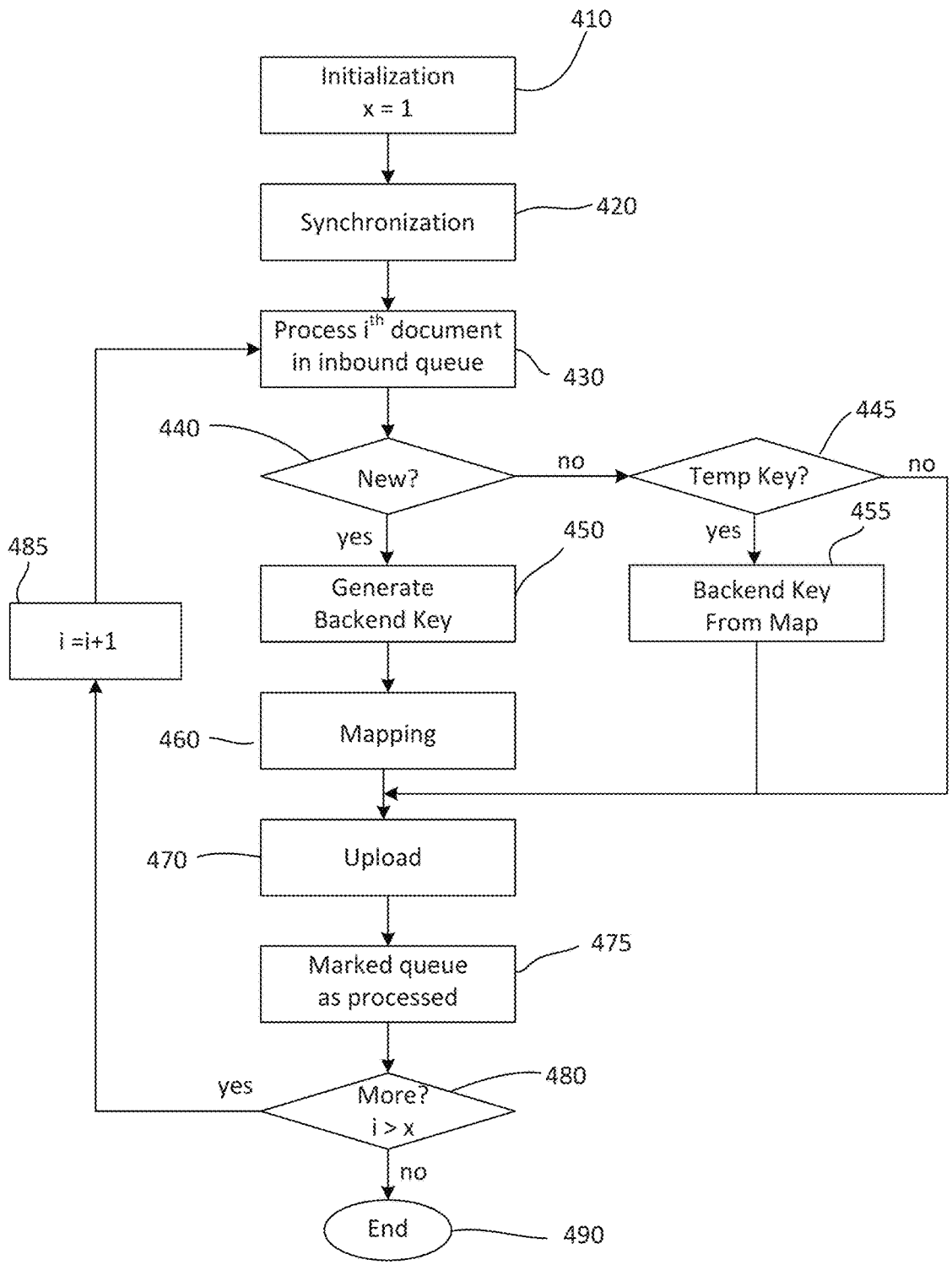
FIG. 4 shows an embodiment of a backend of the update process flow.

FIG. 4 shows an embodiment of a process 400 for uploading of data created offline. For example, the process is performed by the backend sub-system residing on the server. At step 410, the process is initialized for uploading. For example, when the end user device is online, the uploading process is initialized. Uploading may be automatically performed when the end user device is online or when the user initiates the process when online. Initialization includes setting counter x to 1.

At step 420, the contents of the synchronization queue is copied to the inbound queue. For example, the inbound queue unit of the backend database module is synchronized with the synchronization queue of the client runtime unit on the frontend sub-system. At step 430, the entries in the inbound queue are processed. For example, the uploader processes the entries in the inbound queue. In one embodiment, the entries or document of the inbound queue are processed one at a time. For example, the $i^{th}$ document of the inbound queue is processed.

Processing the document utilizes the logic unit of the processor unit of the backend sub-system. The processing determines if the document is a newly created document or not at step 440. For example, if the document is a newly created document, the process proceeds to step 450. At step 450, the backend key is generated for the newly created document. For example, the backend key generator generates a backend key for the newly created document. In one embodiment, the backend key may be a backend key pair with a human readable key and a non-human readable key. The mapper maps the backend key to the temporary key at step 460 and stores the pair of mapped keys in the mapping table. For example, the mapped keys are stored as an entry table in a mapping table in the backend database module. The process continues to step 470.

On the other hand, if the document is not a newly created document, the process proceeds to step 445. At step 445, the process determines if this is a change of a newly created document within the same offline session. A change to a newly created document has a temporary or client key assigned to it. The temporary key of the change is the same as that of the newly created document. The change, for example, includes the use of the data of the newly created document. If the document is not a newly created document and has a temporary key, the process proceeds to step 455.

At step 455, the process extracts the temporary key of the changed document. The process calls the mapper at step 460. The mapper, for example, checks the mapping table and exchanges the temporary key with the backend key that is mapped to it. The process continues to step 470. On the other hand, if the document is a change of an existing synchronized document, it already has a backend key associated with it. As such, the process continues to step 470.

At step 470, the process uploads the data change in the data unit of the backend database. The document is uploaded based on the backend key. For example, an image of the document is added into the backend database. The process marks the entry in the inbound queue as processed at step 475. The process continues to step 480 to determine if there are more entries in the inbound queue to process. For example, if x is less than or equal to the last document of the inbound queue, the process proceeds to step 485 where x is incremented by 1. The process then returns to step 430 and repeats until all entries have been processed. For example, if x is greater than the last document, the process terminates at step 490.

As for the frontend sub-system, it may be synchronized as well. For example, the key pairs are exchanged. New backend keys are exchanged with the corresponding client keys in the frontend sub-system. In some embodiments, documents with the new backend keys may be updated in the frontend sub-system. This may include deleting the document with the client key in the client database and replacing it with the document with the new backend key. Other techniques for updating the frontend sub-system or client database may also be useful.

As described, the various modules of the enterprise system may be embodied as an enterprise application. For example, the various modules may be embodied as a software application. The source code or codes of the application may be compiled to create an executable code. The codes, for example, may be stored in a storage medium such as one or more storage disks. Other types of storage mediums may also be useful.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer implemented method for synchronizing data comprising:
receiving, by an inbound queue at a back-end sub-system over a communications network, offline change data originating as entries in synchronization queues on a plurality of client-side subsystems, the offline change data being generated at the client-side subsystems when the client-side subsystems are not connected to the back-end sub-system over the communications network, wherein the offline change data represents changes that have not been synchronized with the back-end system, and wherein at least one of the entries reflects creation of a new base document, at least one of the entries reflects a change to the new base document, and at least one of the entries reflects a change to a previously synchronized based document, wherein for the respective synchronization queues, the first entry is the earliest offline change data and the last entry is the latest offline change data; and
synchronizing, by the back-end sub-system, the entries in the synchronization queues until all such entries are processed, wherein the synchronizing comprises:
upon determining that the entry corresponds to creation of a new base document, generating a new backend key associated with the new base document, mapping the new backend key to a client key generated at the corresponding client-side subsystem and associated with the new base document to form a mapped key pair in a key mapping table, and storing change data specified by the entry in the back-end sub-system in association with the new backend key;
upon determining that the entry corresponds to a change to the new base document, identifying, using the client key corresponding to the new base document, the new backend key generated during the synchronizing using the key mapping table, and storing change data specified by the entry in the back-end sub-system in association with the new backend key, and
upon determining that the entry corresponds to a change to a previously synchronized base document associated with a pre-existing backend key, storing change data specified by the entry in the backend sub-system in association with the pre-existing backend key.

2. The method of claim 1, wherein the entries are sequentially processed.

3. The method of claim 2, wherein the entries are processed on a first in first out (FIFO) basis.

4. The method of claim 1, wherein the synchronization queues have x number of entries for generating x number of change data while offline without synchronizing with the backend sub-system, and wherein the x number of entries being stored in the synchronization queue is based on a time when the change data is generated.

5. A system comprising:
at least one programmable data processor; and
memory storing instructions which, when executed by the at least one programmable data processor, result in operations comprising:
receiving, by an inbound queue at a back-end sub-system over a communications network, offline change data originating as entries in synchronization queues on a plurality of client-side subsystems, the offline change data being generated at the client-side subsystems when the client-side subsystems are not connected to the back-end sub-system over the communications network, wherein the offline change data represents changes that have not been synchronized with the back-end system, and wherein at least one of the entries reflects creation of a new base document, at least one of the entries reflects a change to the new base document, and at least one of the entries reflects a change to a previously synchronized based document, wherein for the respective synchronization queues, the first entry is the earliest offline change data and the last entry is the latest offline change data; and
synchronizing, by the back-end sub-system, the entries in the synchronization queues until all such entries are processed, wherein the synchronizing comprises:
upon determining that the entry corresponds to creation of a new base document, generating a new backend key associated with the new base document, mapping the new backend key to a client key generated at the corresponding client-side subsystem and associated with the new base document to form a mapped key pair in a key mapping table, and storing change data specified by the entry in the back-end sub-system in association with the new backend key;
upon determining that the entry corresponds to a change to the new base document, identifying, using the client key corresponding to the new base document, the new backend key generated during the synchronizing using the key mapping table, and storing change data specified by the entry in the back-end sub-system in association with the new backend key, and
upon determining that the entry corresponds to a change to a previously synchronized base document associated with a pre-existing backend key storing change data specified by the entry in the backend sub-system in association with the pre-existing backend key.

6. The system of claim 5, wherein the entries are sequentially processed.

7. The system of claim 6, wherein the entries are processed on a first in first out (FIFO) basis.

8. The system of claim 5, wherein the synchronization queues have x number of entries for generating x number of change data while offline without synchronizing with the backend sub-system, and wherein the x number of entries being stored in the synchronization queue is based on a time when the change data is generated.

9. Non-transitory computer-readable media storing instructions which, when executed by at least one computer, result in operations comprising:
receiving, by an inbound queue at a back-end sub-system over a communications network, offline change data originating as entries in synchronization queues on a plurality of client-side subsystems, the offline change data being generated at the client-side subsystems when the client-side subsystems are not connected to the back-end sub-system over the communications network, wherein the offline change data represents changes that have not been synchronized with the back-end system, and wherein at least one of the entries reflects creation of a new base document, at least one of the entries reflects a change to the new base document, and at least one of the entries reflects a change to a previously synchronized based document, wherein for the respective synchronization queues, the first entry is the earliest offline change data and the last entry is the latest offline change data; and
synchronizing, by the back-end sub-system, the entries in the synchronization queues until all such entries are processed, wherein the synchronizing comprises:
upon determining that the entry corresponds to creation of a new base document, generating a new backend key associated with the new base document, mapping the new backend key to a client key generated at the corresponding client-side subsystem and associated with the new base document to form a mapped key pair in a key mapping table, and storing change data specified by the entry in the back-end sub-system in association with the new backend key;
upon determining that the entry corresponds to a change to the new base document, identifying, using the client key corresponding to the new base document, the new backend key generated during the synchronizing using the key mapping table, and storing change data specified by the entry in the back-end sub-system in association with the new backend key, and
upon determining that the entry corresponds to a change to a previously synchronized base document associated with a pre-existing backend key storing change data specified by the entry in the backend sub-system in association with the pre-existing backend key.

10. The computer-readable media of claim 9, wherein the entries are sequentially processed.

11. The computer-readable media of claim 10, wherein the entries are processed on a first in first out (FIFO) basis.

12. The computer-readable media of claim 9, wherein the synchronization queues have x number of entries for generating x number of change data while offline without synchronizing with the backend sub-system, and wherein the x number of entries being stored in the synchronization queue is based on a time when the change data is generated.

* * * * *